(12) United States Patent
Ojima et al.

(10) Patent No.: US 7,224,393 B2
(45) Date of Patent: May 29, 2007

(54) IMAGE PICKUP DEVICE, METHOD, PROGRAM PRODUCT, AND RECORDING MEDIUM

(75) Inventors: Noriaki Ojima, Yokohama (JP); Masato Sannoh, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 691 days.

(21) Appl. No.: 10/340,660

(22) Filed: Jan. 13, 2003

(65) Prior Publication Data
US 2003/0133025 A1 Jul. 17, 2003

(30) Foreign Application Priority Data
Jan. 11, 2002 (JP) ............................. 2002-005307
Oct. 31, 2002 (JP) ............................. 2002-319129

(51) Int. Cl.
*H04N 5/222* (2006.01)
(52) U.S. Cl. ............................ 348/333.03; 348/333.12
(58) Field of Classification Search ..................... None
See application file for complete search history.

(56) References Cited

U.S. PATENT DOCUMENTS 6,476,868 B1* 11/2002 Kaji et al. ............. 348/333.12
6,903,765 B1* 6/2005 Takagi et al. ............ 348/211.4
6,906,746 B2* 6/2005 Hijishiri et al. .......... 348/240.2
2002/0067412 A1* 6/2002 Kawai et al. ............... 348/211
2003/0071904 A1* 4/2003 Karasaki et al. ......... 348/231.3

FOREIGN PATENT DOCUMENTS

JP 6-165012 6/1994

OTHER PUBLICATIONS

U.S. Appl. No. 10/025,803, filed Dec. 26, 2001, Ojima.
U.S. Appl. No. 10/125,483, filed Apr. 19, 2002, Ojima.
U.S. Appl. No. 10/120,369, filed Apr. 12, 2002, Sannoh et al.
U.S. Appl. No. 10/452,050, filed Jun. 3, 2003, Kitajima et al.
U.S. Appl. No. 10/764,449, filed Jan. 27, 2004, Ojima et al.
U.S. Appl. No. 10/909,397, filed Aug. 3, 2004, Ojima.

* cited by examiner

*Primary Examiner*—Ngoc-Yen Vu
*Assistant Examiner*—Dillon Durnford-Geszvain
(74) *Attorney, Agent, or Firm*—Oblon, Spivak, McClelland, Maier & Neustadt, P.C.

(57) ABSTRACT

An image pickup device, method, computer program product, and information recording medium for recording image information corresponding only to a predetermined area at a given position in an image display device. An image pickup device, method, computer program product, and information recording medium for zooming in electrically an image in a predetermined area at an arbitrarily chosen given position and displaying the zoomed image in an image display device.

26 Claims, 4 Drawing Sheets

IMAGE PICKUP DEVICE, METHOD, PROGRAM PRODUCT, AND RECORDING MEDIUM

BACKGROUND OF THE INVENTION

1. Field of the Invention

This invention relates to an image pickup device, method, computer program product, and recording medium that can change a digital zoom area in or out of a zooming process and/or can obtain a view of images outside of the digital zoom area.

2. Discussion of the Background Art

An image pickup device, typified by a digital camera, has a digital zoom function as a zoom function. In this digital zoom function an image is not zoomed by a zoom lens as in an optical zoom function, but instead the digital zoom function is a geometrical conversion process carried out on an image signal obtained as an electronic signal. In other words, the digital zoom function is an electronic zoom process.

Up to now, it has been common for the zoom process to be carried out on a central region in a monitor display screen obtained as an object to be imaged, just as in an optical zoom function. Namely, the zoom process has been carried out as a zooming in on the central region in the monitor display screen, and image data corresponding to that central zoomed area has been recorded.

When the zoom process is carried out, since the monitor display screen displays a picked-up image screen, it is often inconvenient at the time of photographing that images that lie outside of the digital zoom area, i.e., that lie outside of the central region of the monitor display screen, can not be seen or zoomed on by an operator of the digital camera.

Laid-Open Japanese Patent Application No. 6-165012 discloses displaying the monitor display screen after combining a small screen image that is not zoomed onto with a part of the monitor screen image that is zoomed onto.

SUMMARY OF THE INVENTION

The inventors of the present application, however, have recognized that it is convenient for an operator of the digital camera that the zoom process and recording are carried out at any point within the display in the monitor display screen, i.e. at any point in a photographed image, without having to move or refocus a lens.

The inventors of the present invention have also recognized that combining a small screen image to check an aspect around the digital zoom area with a zoomed image, as in JP 6-165,012 as above stated, has disadvantages from the aspects of cost, image processing speed, and battery life because such an operation requires an image combining device.

Accordingly, one object of the present invention is to provide a novel image pickup device, method, computer program product, and recording medium in which a zoom process and recording are carried out at any point within a display in a monitor display screen, i.e. at any point in a photographed image, without having to move or refocus a lens.

It is another object of the present invention to provide a novel image pickup device, method, computer program product, and recording medium that can check an aspect around a digital zoom area (recording area) without having to combine a small screen image with a zoomed image.

According to an aspect of the present invention an image pickup device, method, computer program product, and recording medium for recording only image information corresponding to an image marked in a given area within a display is provided.

According to another aspect of the present invention, an image pickup device, method, computer program product, and recording medium for electrically zooming in an image arbitrarily marked at any point a given area within a display is provided.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
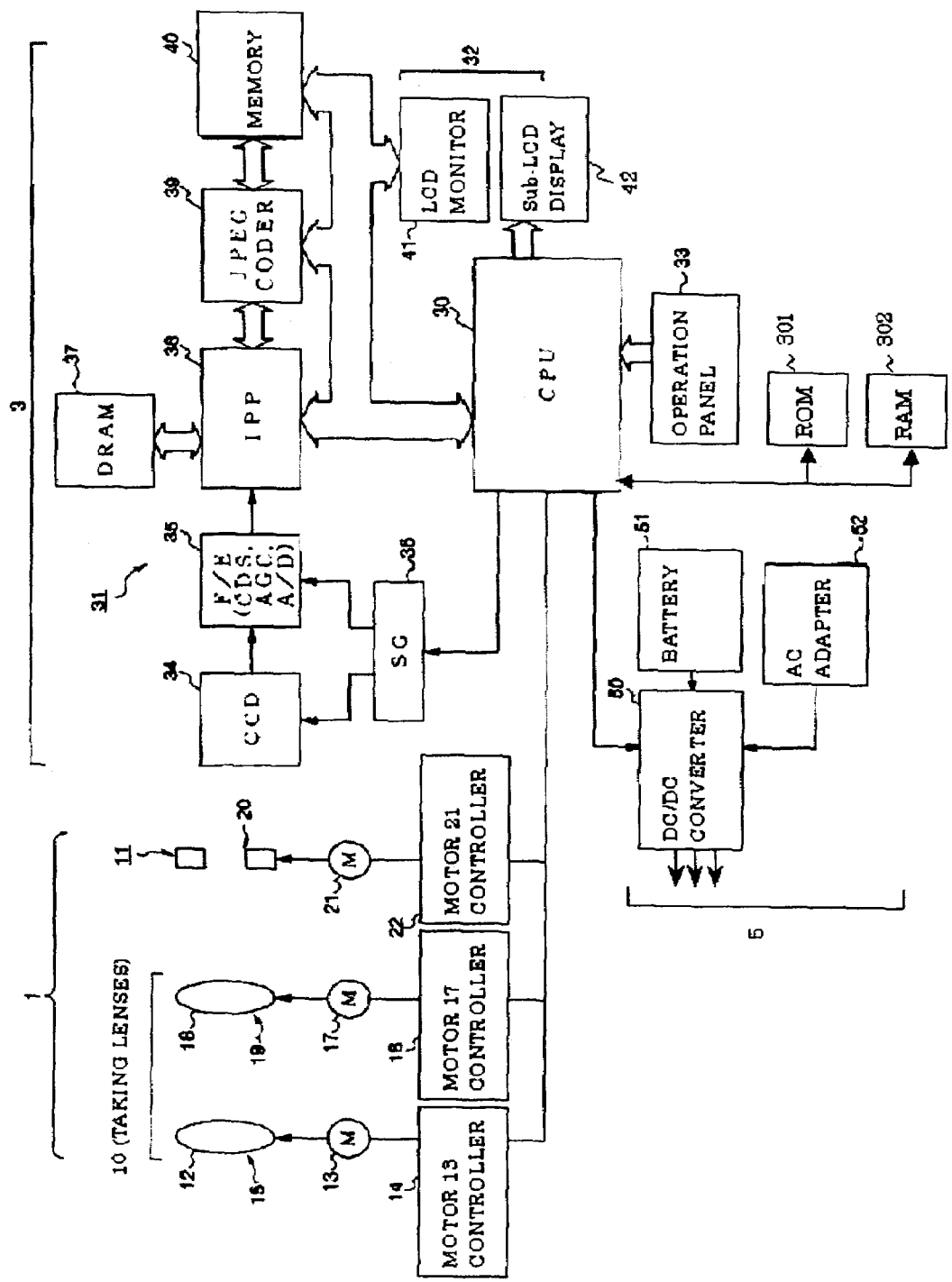
FIG. 1 shows a schematic circuit block diagram of a typical digital camera, including a digital camera in which the features of the present invention can be utilized.

FIG. 1 shows a schematic circuitry of a digital still camera as an example of an image pickup device of the present invention. In FIG. 1, the image pickup device includes an optical device section 1, an image processing device section 3, and power supply equipment 5. The optical device section 1 includes an imaging lens system 10 for taking an optical image of an object and an aperture/shutter system 11. The imaging lens system 10 has an optical zoom segment 15 that includes a zoom lens 12, a motor driver 13, and a motor controller 14. The imaging lens system 10 also includes a focus segment 19 that includes a focus lens 16, a drive motor 17, and a motor controller 18. The aperture/shutter system 11 includes an aperture/shutter 20, a drive motor 21, and a motor controller 22. Each of the motor controllers 14, 18, 22 is controlled by a drive command from a CPU 30 based on a sensed input from a sensor or an operation input from an operation panel 33.

A control program, i.e., a code readable by the CPU 30, is stored in a ROM 301. In a case of turning ON the power in this digital still camera, the control program is loaded into a main memory in the CPU 30 from the ROM 301. The CPU 30 controls operations in each of the blocks according to the control program and stores data as necessary for controlling the blocks in the RAM 302, temporarily. Additionally, a zoom process of the present invention in this embodiment is run on the CPU 30 according to the control program stored in the ROM 301 as described below.

The image processing device 3 includes an image processing segment 31 centered on the CPU 30, a display 32, and the operation panel 33. In the image processing segment 31, a CCD 34 is connected to a Front end (F/E) chip 35 and a signal generator (SG) 36 is connected to the CCD 34 and the F/E chip 35 respectively. The CCD 34 is a solid-state image sensing device for photoelectrically transferring an electronic signal from an optical image. The F/E chip 35 has a correlation double sampling (CDS) function for removing image noise, an automatic gain control (AGC) function for gain compensation, and an analog/digital (A/D) conversion function for converting an analog image signal to a digital signal. The SG 36 is a timing signal generator to the CCD 34 and F/E chip 35 controlled by the CPU 30.

Image processing segment 31 also includes an image pre-processor (IPP) 38 connected to a DRAM 37 and F/E chip 35. The IPP 38 is connected to a JPEG coder 39 and memory 40 in this order. Signal data are given and received through buses between the IPP 38 and the DRAM 37, between the IPP 38 and the JPEG coder 39, between the JPEG coder and the memory 40, and also among the IPP 38, the JPEG coder 39, the memory 40, the CPU 30, and an LCD monitor 41 in the display 32.

The IPP 38 is an image converting computing unit that has a function for converting a digital image signal input from the F/E chip 35 into a digital color image signal expressed as RGB (Red-Green-Blue) colors and again converting to a digital color video signal expressed as YUV (Y-signal, U-signal, V-signal) colors. The DRAM 37 is a memory for storing or loading an image signal or a video signal between the IPP 38. Additionally, the below discussed digital zoom function is executed by converting only a potion of an image based on a command from the CPU 30 during converting in the IPP 38.

The JPEG coder 39 has image compression and decompression functions of eliminating elements of color changes and high frequencies from the color video signal. The memory 40 is a storage device for a compressed color video signal. In this embodiment, a memory card is adopted as the memory 40. Alternatively, another semiconductor memory, optical memory, etc., may be utilized.

In the image processing device 3, the display 32 includes the LCD monitor 41 and a sub-LCD display unit 42. The LCD monitor 41 displays an image processed at the image processing segment 31. The sub-LCD display unit 42 displays information from the CPU 30. The image processing device 3 also includes the operation panel 33 as an operation input device for the CPU 30. The operation panel 33 can include different buttons such as a shutter release button, a zooming button, a cross-shape button, etc., established on the digital still camera. Alternatively, the operation panel 33 may have a touch panel established on the LCD monitor 41, may be a remote-control device, etc.

The power supply equipment 5 includes a DC/DC converter 50, a battery 51, and an AC adapter 52. The DC/DC converter 50 is connected to the battery 51 and the AC adapter 52.

A digital zoom function of the present invention is started by an operator operating an input on the operation panel 33. In a mere digital zoom operation as per usual, the CPU 30 outputs a conversion command of a video signal corresponding to, i.e. viewed at, a central portion in the screen (i.e. a central portion of an image displayed on the LCD monitor 41) to the IPP 38 based upon a zoom operation being chosen on the operation panel 33. As a result of this operation, only the central portion in the LCD monitor 41 of an object being photographed is zoomed gradually, and the zoomed screen itself corresponding to a selected zoom ratio is displayed on the LCD monitor 41.

In this usual zoom operation a predetermined area within a region displayed on the LCD monitor 41 is defined as a marking area. The marking area is marked with a frame or a crisscross. In other words, the frame marking or the crisscross marking specifies the marking area corresponding to a photographed or picked-up image. In a case of recording or saving image information corresponding to a photographed or picked-up image to memory 40, the image information corresponding to an image displayed in the marking area is recorded or saved. In a case of a digital zoom operation, the digital zoom is only executed on the image within the marking area of an image displayed on the LCD monitor 41. In a case of using a crisscross marking, a crossed portion of the crisscross marking coincides approximately with a central portion in the marking area.

One feature of the present invention is that the image pickup device is able to change and/or set a position of the marking area in a display screen image of an image of an object being photographed and displayed on the LCD monitor 41. In other words, the marking area position indicating the portion of the photographed object to be subject to the zoom operation, marked as a frame position or a crisscross position on the LCD monitor 41, can be arbitrarily moved continuously or intermittently by a user of the digital camera within the display screen and/or set by a position change input from the operation panel 33. If the operation panel 33 has a cross-shape button or a similar indicator on a touch panel, it is easy to input the position change input operation.

A frame marking adopted as a marking area display may make it possible to quickly see a position and a range of the marking area where the digital zoom operation is being executed on the LCD monitor 41. The crisscross marking adopted as a marking area display may make it possible to quickly see a center portion of a predetermined area where the digital zoom operation is being executed on the LCD monitor 41.

CPU 30 reads out the frame position or the crisscross position in the screen as a marking area position and transmits the read-out data to the IPP 38 as a marking position information. The IPP 38 performs a zoom process of a portion conversion of an image corresponding to the marking area. The changing and/or setting for the marking area may be performed before a zoom process starts. Alternatively, the changing and/or setting for the marking area may be performed during the zoom process by a branch process, etc.

A process to change and/or set a zoom ratio for the marked area and a zoom ratio for a display screen area in the LCD monitor 41 respectively is also performed by an operation input from the operation portion 33.

FIG. 3(a), FIG. 3(b), FIG. 3(c), and FIG. 3(d) show examples of the case in which frame markings are displayed as marked areas. FIG. 4(a), FIG. 4(b), FIG. 4(c), and FIG. 4(d) show examples of the case in which crisscross markings are displayed as marked areas.

Figure 3A:
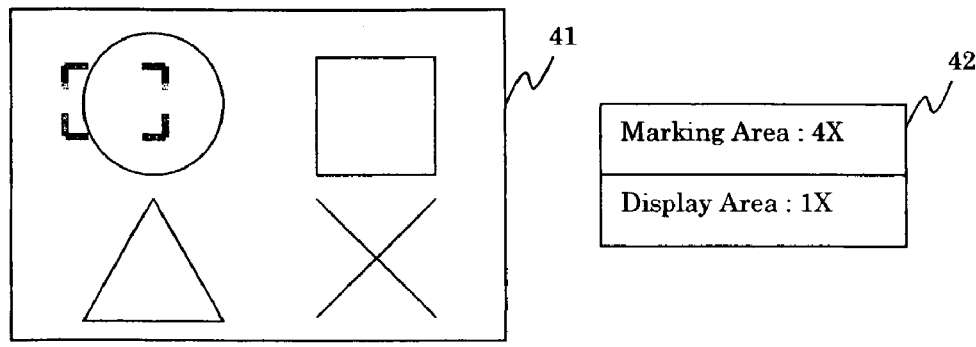
FIG. 3 shows an example of monitor displays in a case of making marking areas frame markings.
Figure 3B:
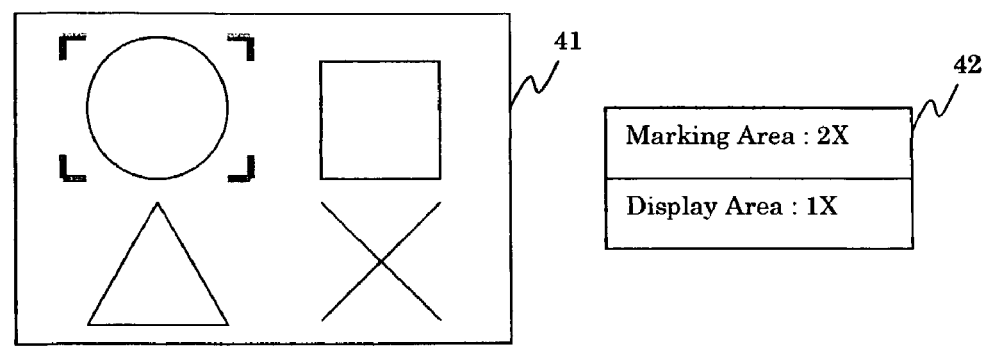
Figure 3C:
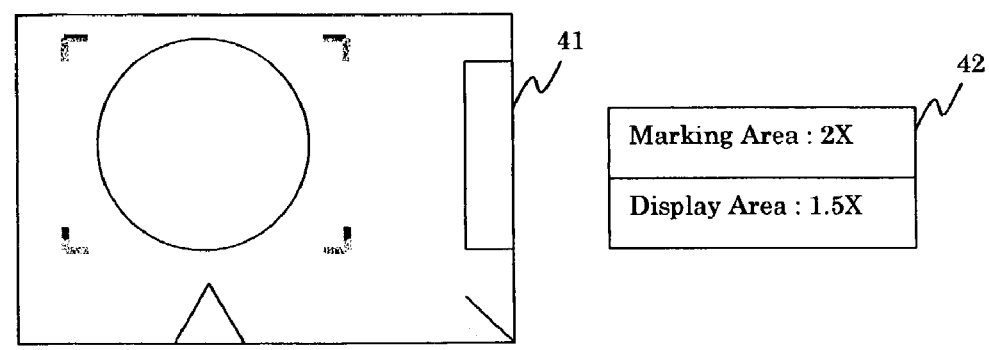
Figure 3D:
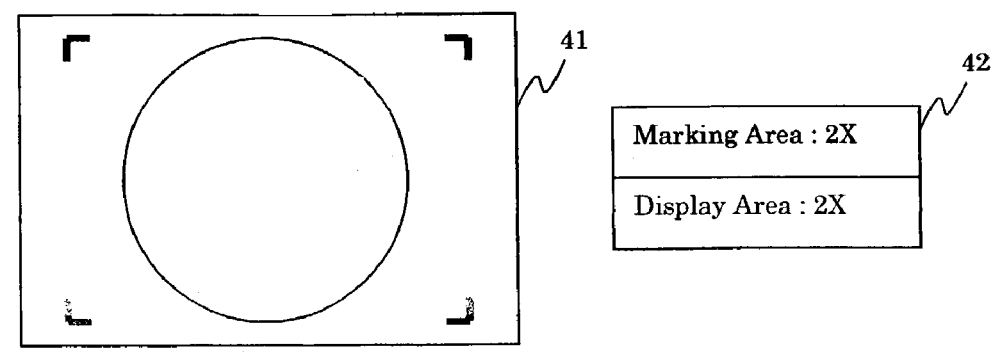
Figure 4A:
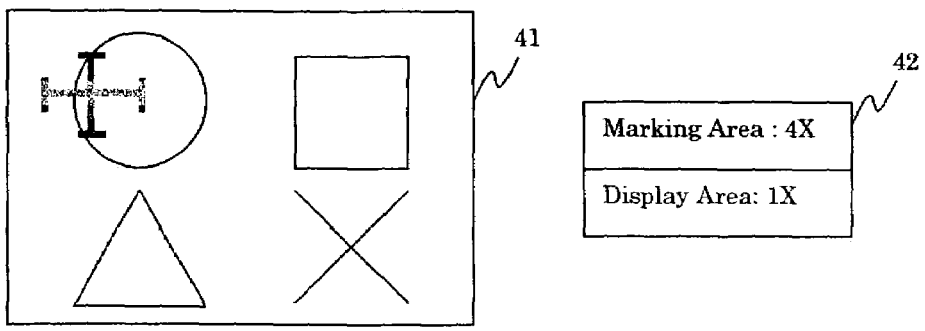
FIG. 4 shows an example of monitor displays in a case of making marking areas crisscross markings.
Figure 4B:
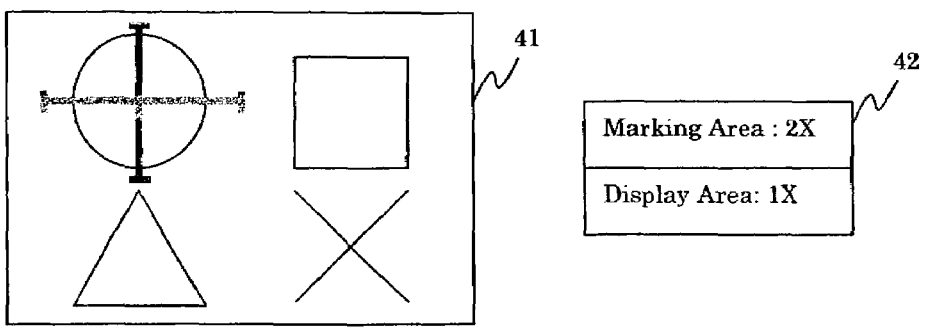
Figure 4C:
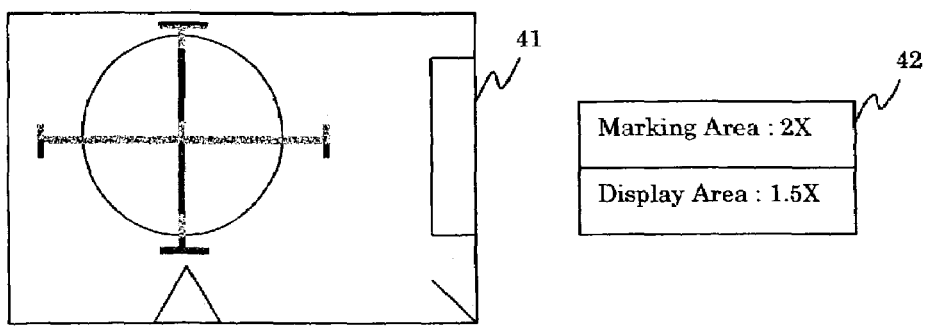
Figure 4D:
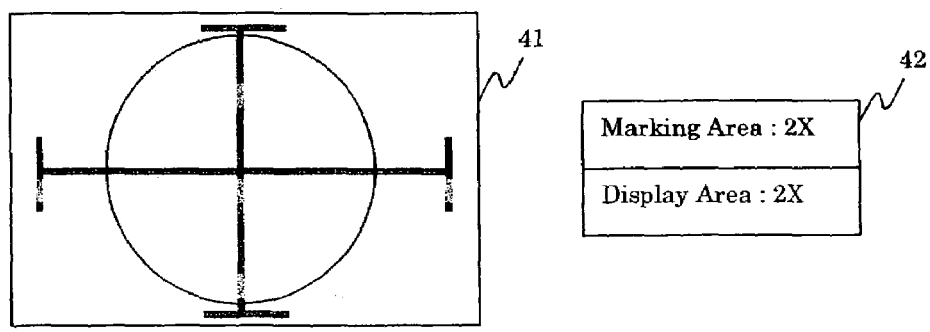

Each of FIGS. 3(a)–4(d) shows information that can be simultaneously displayed on the LCD monitor 41 and the sub-LCD display 42. The sub-LCD display 42 will display zoom ratios of a size of a marked area to the zoom ratio of a display area. When the marked area has the same zoom ratio as the display area the marked area will occupy the entire display area. When the marked area has a higher zoom ratio than the display area the marked area will only occupy a portion of the display area. For example in FIG. 3(a) the zoom ratio of the area in the marked area is four times and the zoom ratio in the display area is one times. In FIG. 3(a) the marked area is thereby ¼ of the total display area.

Further, FIGS. 3(a)–3(d) show a marked area being designated by a frame and FIGS. 4(a)–4(d) show a marked area being designated by a crisscross pattern. As discussed above one of the features of the present invention is that the marked area designated by the frame or the crisscross pattern can be arbitrarily set. In the specific embodiment shown in FIGS. 3(a)–3(d) the circle region of the displayed image is set to be zoomed in on. However, it should be clearly understood that any area within the display screen 41, i.e. in the examples shown in FIGS. 3(*a*)–4(*d*) any of the geometric patterns of the square, triangle, or X, can be zoomed in on and chosen as the area in the display to be subject to the zoom operation.

Thereby, FIG. 3(*a*) and FIG. 4(*a*) present a case in which a zoom ratio for a marked area is 4 times and a zoom ratio for a display screen area is 1 time. FIG. 3(*b*) and FIG. 4(*b*) present a case in which a zoom ratio for a marked area is 2 times and a zoom ratio for a display screen area is 1 time. FIG. 3(*c*) and FIG. 4(*c*) present a case in which a zoom ratio for a marked area is 2 times and a zoom ratio for a display screen area is 1.5 time. FIG. 3(*d*) and FIG. 4(*d*) present a case in which a zoom ratio for a marked area is 2 times and a zoom ratio for a display screen area is 2 times.

The zoom ratios for the marked areas are higher than those for display screen areas in FIG. 3(*a*), FIG. 3(*b*), FIG. 3(*c*), FIG. 4(*a*), FIG. 4(*b*), and FIG. 4(*c*). The zoom ratios for the marked areas are the same zoom ratios as those for display screen areas in FIG. 3(*d*) and FIG. 4(*d*). The display screen areas are not zoomed in on in FIG. 3(*a*), FIG. 3(*b*), FIG. 4(*a*), and FIG. 4(*b*).

A high zoom ratio for a display screen area makes an angle of field narrow and a low zoom ratio for a display screen area makes an angle of field wide. If a zoom ratio for a marked area, however, is higher than that for a display screen area, an image including the marked area corresponding to its zoom ratio is displayed in the display screen in the LCD monitor 41. In other words, users are able to check aspects around the marked area in the zoom process or photographing process. Both zoom ratios are displayed in the sub-LCD display unit 42.

The CPU 30 transmits an image conversion control information to the IPP 38 according to each of the zoom ratios for the marked area and the display screen area. The IPP 38 converts images in ranges corresponding to each of the zoom ratios for the marked area and the display screen area based on the image conversion control information. A display screen image whose zoom ratio is lower than that of the marked area is displayed in the LCD monitor 41 as described in FIG. 3(*a*), FIG. 3(*b*), FIG. 3(*c*), FIG. 4(*a*), FIG. 4(*b*), and FIG. 4(*c*). Alternatively, the LCD monitor 41 may display a display screen image whose zoom ratio is the same as that of the marked area as described in FIG. 3(*d*) and FIG. 4(*d*). The changing and/or setting of each of the zoom ratios for the marked area and the display screen area may be performed during the process of zoom by a branch process etc.

Alternatively, the IPP 38 may form characters corresponding respectively to two zoom ratios based on a command from the CPU 30 and may display such on the LCD monitor 41. In this case, an operator is able to understand the zoom ratios without having to view the sub-LCD display unit 42.

Figure 2:
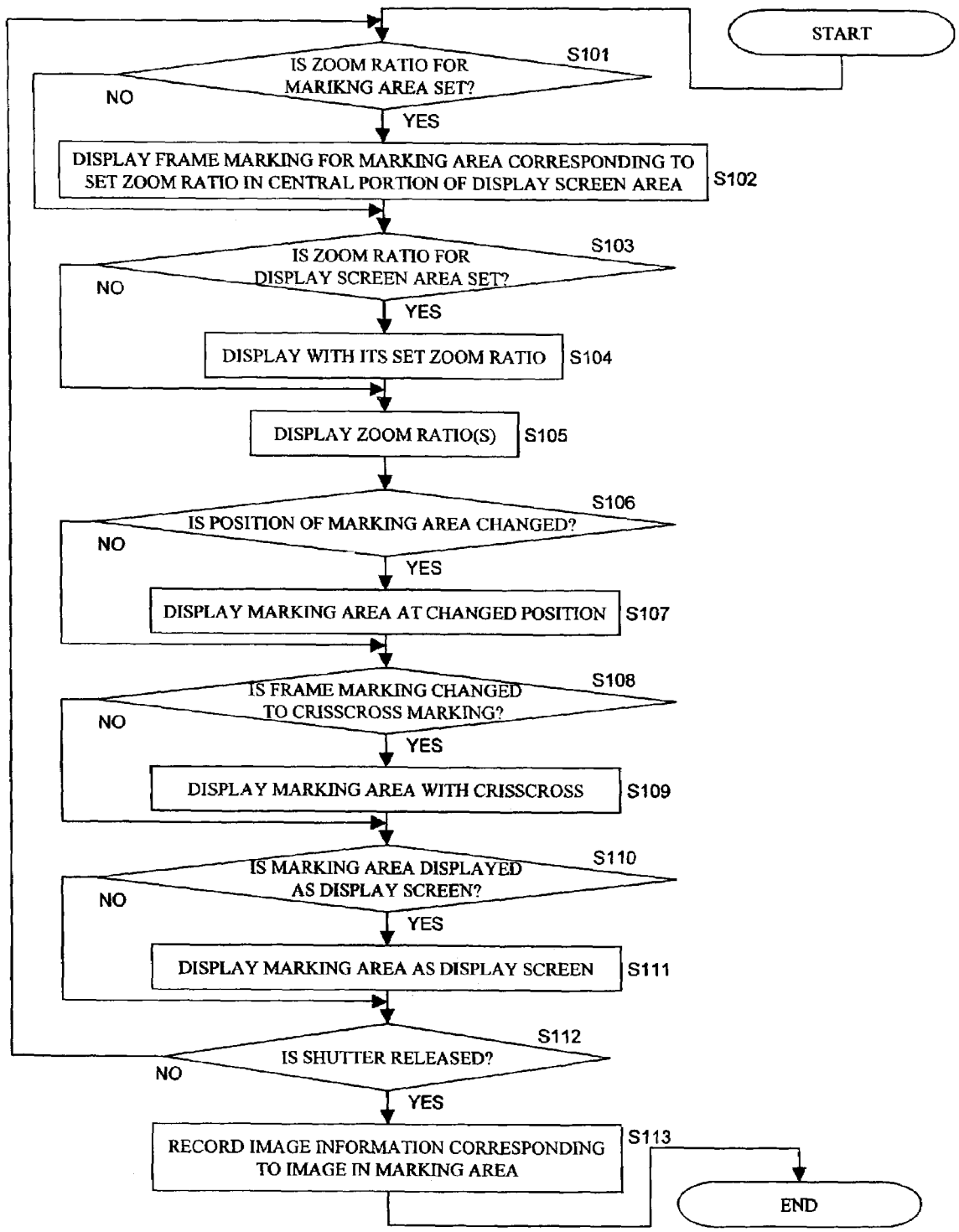
FIG. 2 shows a flowchart of an image pickup process of the present invention.

FIG. 2 shows an example of a flowchart of an image pickup process utilized in the present invention. The operations in the flowchart are run by the CPU 30 according to the control program stored in the ROM 301.

The CPU 30 first judges whether the zoom ratio for the marked area is changed and/or set by an operator after the image pickup process starts (in step S101). If the operation to the operation panel 33 is performed by the operator (Yes in step S101), the CPU 30 changes and/or sets the zoom ratio for the marked area. In this case, the CPU 30 displays a frame marking of the marked area whose size corresponds to the changed zoom ratio in the central portion on the LCD monitor 41 (in step S102). On the other hand, if the operation to the operation panel 33 is not performed by the operator (No in step S101), step S102 is skipped.

The CPU 30 then judges whether the zoom ratio for the display screen area is changed and/or set by a user (in step S103). If the operation to the operation panel 33 is performed by the user (Yes in step S103), the CPU 30 changes and/or sets the zoom ratio for the display screen area. In this case, the CPU 30 displays a display screen image corresponding to the changed zoom ratio on the LCD monitor 41 (in step S104). This change for the display screen causes the size of the frame marking of the marked area to be changed automatically. If the operation on the operation panel 33 is not performed by the user (No in step S103), step S104 is skipped.

The CPU 30 then displays at least one of the zoom ratios for the marked area and the display screen area on the sub-LCD display unit 42 (in step S105). Alternatively, these zoom ratios may be displayed on the LCD monitor 41. Furthermore, the CPU 30 may change each of the zoom ratios with respect to each change of the zoom ratios for the marked area and the display screen area.

The CPU 30 then judges whether a position of the marked area is changed and/or set by the user (in step S106). If the operation to the operation portion 33 is performed by the user (Yes in step S106), the CPU 30 changes and/or sets the position of the marked area. The CPU 30 displays the frame marking of the marked area in the changed position (in step S107). If the operation to the operation panel 33 is not performed by the user (No in step S106), step S107 is skipped.

The CPU 30 then judges whether the frame marking is changed to the crisscross marking and/or set its marking by the user (in step S108). If the operation to the operation portion 33 is performed by the user (Yes in step S108), the CPU 30 displays the marked area with the crisscross marking (in step S109). If the operation to the operation panel 33 is not performed by the user (No in step S108), step S109 is skipped.

The CPU 30 then judges whether the whole marking area is displayed as a display screen on the LCD monitor 41 by the user (in step S110). If the operation to the operation portion 33 is performed by the user (Yes in step S110), the CPU 30 displays the whole marked area as the display screen on the LCD monitor 41 (in step S111). This process makes a situation shown in FIG. 3(*b*) and/or FIG. 3(*c*) transition to a situation shown in FIG. 3(*d*) for instance. The CPU 30 makes the zoom ratio for the display screen area the zoom ratio for the marked area by the digital zoom process, if the zoom ratio for the marked area is higher than that for the display screen area. In other words, CPU 30 zooms the marked area to the display screen area by the digital zoom process. CPU 30, further, fits the central portion of the marked area to the central portion of the display screen area. As it turns out, CPU 30 displays the whole marked area as the display screen on the LCD monitor 41. It is enough for the CPU 30 to only fit the central portion of the marked area to the central portion of the display screen area, if each of the zoom ratios is the same. If the operation to the operation panel 33 is not performed by the user (No in step S110), step S111 is skipped.

CPU 30 then judges whether the shutter is released by the user (in step S112). If the shutter is released by an input operation to the operation portion 33 (Yes in step S112), the CPU 30 records image information corresponding to an image displayed in the marked area on the memory 40 (in step S113). CPU 30 may record image information before or after the digital zoom process. If adopting the former alternative, the user reduces a volume of data to be recorded. If adopting the latter alternative, the user saves labor of subsequent image data processing. On the hand, if the shutter is not released (No in step S112), the CPU 30 goes back the first step S101. Alternatively, the CPU 30 may hold operations until releasing of the shutter.

The processes of FIG. 2 need not be performed in the specific order noted. Since the processes accompany the judgment by the operator, the CPU 30 may perform operations in an arbitrary order based on user's choices. In steps S101, S103, S106, S108 and S110, the CPU 30 may perform the processes corresponding to "Yes" by interrupt handling operation. Additionally, the CPU 30 need not to perform all processes through A to G.

Alternatively, the control program may be recorded on a hand-held information recording medium such as an optical disc (e.g., a CD-ROM, MO) or magnetic disc such as a hard disc. In this case, the program may be installed on the ROM 301 through the Internet or the personal computer and the CPU 30 may perform.

The present invention provides that zoom process and recording are carried out at any point within the display in the monitor display screen without having to change a position of a lens. It is able to check an aspect around a digital zoom area (recording area) without combining a small screen image.

Obviously, numerous modifications and variations of the present invention are possible in light of the above teachings. It is therefore to be understood that within the scope of the appended claims, the present invention may be practiced otherwise than as specifically described herein.

The invention claimed is:

1. An image pickup device comprising:
   image pickup means for photographing an object and outputting image information;
   image display means for displaying an image corresponding to the image information output by the image pickup means in an image display device;
   predetermined area setting means for setting a predetermined area at any arbitrary position in the image displayed in the image display device;
   predetermined area display means for displaying a mark representing the predetermined area in the image displayed in the image display device;
   recording means for recording image information only corresponding to the image in the predetermined area;
   a zoom ratio changing means for changing a zoom ratio for an image displayed in the predetermined area; and
   a zoom ratio display means, separate from the image display means, for displaying the zoom ratio of the display area of the image display device and the zoom ratio of the predetermined area.

2. The image pickup device according to claim 1, further comprising a zoom display judgment means for judging whether an image displayed in the image display device is zoomed in electrically;
   wherein if the zoom display judgment means judges that the image is not zoomed in electrically, image information corresponding to the image in the predetermined area is recorded without zoom.

3. The image pickup device according to claim 1, wherein the mark representing the predetermined area is marked with a frame surrounding the predetermined area in an image displayed in the image display device.

4. The image pickup device according to claim 1, wherein the mark representing the predetermined area is marked with a crisscross whose crossed portion is positioned at a central portion in the predetermined area.

5. The image pickup device according to claim 1, wherein the mark representing the predetermined area is selectable between a frame surrounding the predetermined area and a crisscross whose crossed portion is positioned at a central portion in the predetermined area.

6. An image pickup device comprising:
   image pickup means for photographing an object and outputting image information;
   image display means for displaying an image corresponding to the image information output by the image pickup means in an image display device;
   predetermined area setting means for arbitrarily setting a predetermined area at a given position in the image displayed in the image display device;
   predetermined area display means for displaying a mark representing the predetermined area in the image displayed in the image display device;
   zoom display means for zooming the image in the predetermined area electrically and displaying the zoomed image in the image display device;
   a zoom ratio changing means for changing a zoom ratio for an image displayed in the predetermined area; and
   a zoom ratio display means, separate from the image display means, for displaying the zoom ratio of the display area of the image display device and the zoom ratio of the predetermined area.

7. The image pickup device according to claim 6, further comprising a zoom display judgment means for judging whether an image displayed in the image display device is zoomed in electrically;
   wherein if the zoom display judgment means judges that the image is not zoomed in electrically, image information corresponding to the image in the predetermined area is recorded without zoom.

8. The image pickup device according to claim 6, wherein the mark representing the predetermined area is marked with a frame surrounding the predetermined area.

9. The image pickup device according to claim 6, wherein the mark representing the predetermined area is marked with a crisscross whose crossed portion is positioned at a central portion in the predetermined area.

10. The image pickup device according to claim 6, wherein the mark representing the predetermined area is selectable between a frame surrounding the predetermined area and a crisscross whose crossed portion is positioned at a central portion in the predetermined area.

11. The image pickup device according to claim 6, wherein the predetermined setting means sets the predetermined area while the zoom display means is performing an electrical zoom.

12. An image pickup device comprising:
    an image pickup configured to photograph an object and to output image information;
    an image display configured to display an image corresponding to the image information output by the image pickup in an image display device;
    a predetermined area setting controller configured to set a predetermined area at any arbitrary position in the image displayed in the image display device;
    a predetermined area display configured to display a mark representing the predetermined area in the image displayed in the image display device;
    a recording device configured to record image information only corresponding to the image in the predetermined area;

a zoom ratio changing controller configured to change a zoom ratio for an image displayed in the predetermined area; and a zoom ratio display, separate from the image display, configured to display the zoom ratio of the display area of the image display device and the zoom ratio of the predetermined area.

13. The image pickup device according to claim 12, further comprising a zoom display judgment controller configured to judge whether an image displayed in the image display device is zoomed in electrically;

wherein if the zoom display judgment controller judges that the image is not zoomed in electrically, image information corresponding to the image in the predetermined area is recorded without zoom.

14. The image pickup device according to claim 12, wherein the mark representing the predetermined area is marked with a frame surrounding the predetermined area in an image displayed in the image display device.

15. The image pickup device according to claim 12, wherein the mark representing the predetermined area is marked with a crisscross whose crossed portion is positioned at a central portion in the predetermined area.

16. The image pickup device according to claim 12, wherein the mark representing the predetermined area is selectable between a frame surrounding the predetermined area and a crisscross whose crossed portion is positioned at a central portion in the predetermined area.

17. An image pickup device comprising:

an image pickup configured to photograph an object and to output image information;

an image display configured to display an image corresponding to the image information output by the image pickup in an image display device;

a predetermined area setting controller configured to arbitrarily set a predetermined area at a given position in the image displayed in the image display device;

a predetermined area display configured to display a mark representing the predetermined area in the image displayed in the image display device;

a zoom display configured to zoom the image in the predetermined area electrically and displaying the zoomed image in the image display device;

a zoom ratio changing controller configured to change a zoom ratio for an image displayed in the predetermined area; and a zoom ratio display, separate from the image display, configured to display the zoom ratio of the display area of the image display device and the zoom ratio of the predetermined area.

18. The image pickup device according to claim 17, further comprising a zoom display judgment controller configured to judge whether an image displayed in the image display device is zoomed in electrically;

wherein if the zoom display judgment controller judges that the image is not zoomed in electrically, image information corresponding to the image in the predetermined area is recorded without zoom.

19. The image pickup device according to claim 17, wherein the mark representing the predetermined area is marked with a frame surrounding the predetermined area.

20. The image pickup device according to claim 17, wherein the mark representing the predetermined area is marked with a crisscross whose crossed portion is positioned at a central portion in the predetermined area.

21. The image pickup device according to claim 17, wherein the mark representing the predetermined area is selectable between a frame surrounding the predetermined area and a crisscross whose crossed portion is positioned at a central portion in the predetermined area.

22. The image pickup device according to claim 17, wherein the predetermined setting controller sets the predetermined area while the zoom display means is performing an electrical zoom.

23. A method of image pickup, comprising:

photographing an object;

outputting image information corresponding to the photographed object;

displaying an image corresponding to the image information in an image display device;

arbitrarily setting a predetermined area at a given position in the image displayed in the image display device;

displaying a mark representing the predetermined area in the image displayed in the image display device;

recording image information only corresponding to the image in the predetermined area;

allowing changing a zoom ratio for an image displayed in the predetermined area; and displaying in a sub-display, separate from the image display device, the zoom ratio of the display area of the image display device and the zoom ratio of the predetermined area.

24. A method of image pickup, comprising:

photographing an object;

outputting image information corresponding to the photographed object;

displaying an image corresponding to the image information in an image display device;

arbitrarily setting a predetermined area at a given position in the image displayed in the image display device;

displaying a mark representing the predetermined area in the image displayed in the image display device;

zooming the image in the predetermined area electrically;

displaying the zoomed image in the image display device;

allowing changing a zoom ratio for an image displayed in the predetermined area; and displaying in a sub-display, separate from the image display device, the zoom ratio of the display area of the image display device and the zoom ratio of the predetermined area.

25. A computer-readable computer program product for an image pickup device, wherein the image pickup device includes an image pickup system for photographing an object and outputting image information of the photographed object, and an image display system for displaying an image corresponding to the image information output by the image pickup system in an image display device, the computer program product comprising:

a first computer code for controlling arbitrarily setting a predetermined area at a given position in the image displayed in the image display device;

a second computer code for controlling displaying a mark representing the predetermined area in the image displayed in the image display device;

a third computer control for controlling recording image information only corresponding to the image in the predetermined area;

a fourth computer control for changing a zoom ratio for an image displayed in the predetermined area; and a fifth computer control for displaying the zoom ratio of a display area of the image display device and the zoom ratio of the predetermined area in a sub-display, separate from the image display device.

26. A computer-readable computer program product for an image pickup device, wherein the image pickup device includes an image pickup system for photographing an object and outputting image information of the photographed object, and an image display system for displaying an image corresponding to the image information output by the image pickup system in an image display device, the computer program product comprising:
- a first computer code for arbitrarily setting a predetermined area at a given position in the image displayed in the image display device;
- a second computer code for displaying a mark representing the predetermined area in the image displayed in the image display device;
- a third computer code for zooming the image in the predetermined area electrically and displaying the zoomed image in the image display device;
- a fourth computer code for changing a zoom ratio for an image displayed in the predetermined area; and
- a fifth computer code for displaying the zoom ratio of a display area of the image display device and the zoom ratio of the predetermined area in a sub-display, separate from the image display device.

* * * * *